(12) United States Patent
Harding et al.

(10) Patent No.: US 7,740,779 B2
(45) Date of Patent: Jun. 22, 2010

(54) MULTIPLE CALENDER PROCESS FOR FORMING NON-FIBROUS HIGH MODULUS ULTRA HIGH MOLECULAR WEIGHT POLYETHYLENE TAPE

(75) Inventors: Kenneth C. Harding, Midlothian, VA (US); Gene C. Weedon, Richmond, VA (US)

(73) Assignee: BAE Systems Tensylon H.P.M., Inc, Monroe, NC (US)

( * ) Notice: Subject to any disclaimer, the term of this patent is extended or adjusted under 35 U.S.C. 154(b) by 553 days.

(21) Appl. No.: 11/880,520

(22) Filed: Jul. 23, 2007

(65) Prior Publication Data
US 2008/0251960 A1 Oct. 16, 2008

Related U.S. Application Data

(63) Continuation-in-part of application No. 11/821,659, filed on Jun. 25, 2007, and a continuation-in-part of application No. 11/787,094, filed on Apr. 13, 2007.

(51) Int. Cl.
*B29C 43/26* (2006.01)
(52) U.S. Cl. .................. 264/120; 264/119; 264/288.4
(58) Field of Classification Search .............. None
See application file for complete search history.

(56) References Cited

U.S. PATENT DOCUMENTS

| 4,246,390 | A |   | 1/1981  | Seaver               |
|-----------|---|---|---------|----------------------|
| 4,436,682 | A |   | 3/1984  | Knopp                |
| 4,820,466 | A | * | 4/1989  | Zachariades ...... 264/119 |
| 5,002,714 | A | * | 3/1991  | Sano et al. ......... 264/119 |
| 5,030,402 | A |   | 7/1991  | Zacharides           |
| 5,200,129 | A |   | 4/1993  | Kobayashi et al.     |
| 5,407,623 | A | * | 4/1995  | Zachariades et al. ...... 264/119 |
| 5,721,334 | A | * | 2/1998  | Burstein et al. .......... 526/352 |
| 6,951,685 | B1 |  | 10/2005 | Weedon et al.        |

\* cited by examiner

*Primary Examiner*—Mary Lynn F Theisen

(57) ABSTRACT

A multi-calender process for forming a high modulus, high strength component for use in ballistic-resistant articles. The process includes forming ultrahigh molecular weight polyethylene powder into a uniform sheet at a low pressure. Multiple calender units mold and draw the uniform sheet into a non-fibrous, monolithic, ultra high molecular weight polyethylene tape. The multi-calender process and subsequent draw stages stretch the non-fibrous UHMWPE tape to a total draw of at least 100 to 1 to produce a high modulus, high strength UHMWPE component with a modulus of 1,400 grams per denier or greater. The multi-calender process of the present invention enables production of a high-strength, high-modulus UHMWPE component for ballistic-resistant articles and other applications at significantly higher rates and at a lower unit cost.

19 Claims, 3 Drawing Sheets

US 7,740,779 B2

MULTIPLE CALENDER PROCESS FOR FORMING NON-FIBROUS HIGH MODULUS ULTRA HIGH MOLECULAR WEIGHT POLYETHYLENE TAPE

This application is a Continuation-In-Part of U.S. patent application Ser. No. 11/821,659, filed on Jun. 25, 2007 and entitled "Non-Fibrous High Modulus Ultra High Molecular Weight Polyethylene Tape for Ballistic Applications", and is a Continuation-In-Part of U.S. patent application Ser. No. 11/787,094, filed on Apr. 13, 2007 and entitled "Wide Ultra High Molecular Weight Polyethylene Sheet and Method of Manufacture" of which the entire contents of said applications are incorporated herein in their entirety by reference thereto.

FIELD OF THE INVENTION

This invention relates to processes for forming high modulus materials and more particularly to a process for producing a non-fibrous high modulus ultra high molecular weight polyethylene tape for use as the high modulus and high strength component in ballistic-resistant armor and other applications requiring high strength, high modulus tapes.

BACKGROUND OF THE INVENTION

In U.S. patent application Ser. No. 11/821,659, filed on Jun. 25, 2007 and entitled "Non-Fibrous High Modulus Ultra High Molecular Weight Polyethylene Tape for Ballistic Applications", there was presented a non-fibrous, monolithic, ultra high molecular weight polyethylene tape product and a method for producing it. The non-fibrous UHMWPE tape was obtained by compression molding ultrahigh molecular weight polyethylene powder at a temperature below its melting point and then calendering and drawing and the resultant compression molded polyolefin at a total draw ratio of at least 100:1. A compression force of 25 kgf/cm$^2$ was applied to compress the UHMWPE powder and the resultant sheet was calendered in a single calender nip and subsequently drawn under specific temperature and tension conditions to produce a high modulus tape.

Although the aforementioned patent application adequately provided a high modulus, high strength tape product for use as the high modulus component in ballistic-resistant products, the production rate was limited as a result of the high compression forces required in the compaction portion of the process. Compaction units are constructed of equipment that rises exponentially in cost as the throughput and operating pressure increases, including larger hydraulic cylinders, larger and longer rollers, and a larger framework to support the larger equipment. All of these pieces of equipment must be increased in size and strengthened significantly as the compaction pressure is increased. Therefore, to meet the required throughput in the production of high modulus UHMWPE tape, increasing the pressure on the compaction unit would require a significant investment in larger equipment.

What is needed therefore is a process for producing a high modulus, high strength component for use in ballistic-resistant articles that does not require compacting polyethylene particles at high pressure. The process should produce a high modulus product that includes the properties required for forming the shock-absorbing component in ballistic-resistant articles.

SUMMARY OF THE INVENTION

The invention is a multi-calender process for forming a high modulus, high strength component for use in ballistic-resistant articles. The process includes forming ultrahigh molecular weight polyethylene powder into a uniform sheet at a low pressure. At least two calender units mold and draw the uniform sheet into a non-fibrous, monolithic, ultra high molecular weight polyethylene tape. The first calender unit performs some of the compression and molding previously handled by the compaction unit and therefore enables a significant decrease in the compacting unit operating pressure. The multi-calender process and subsequent draw stages stretch the non-fibrous UHMWPE tape to a total draw of at least 100 to 1 to produce a high modulus, high strength UHMWPE component in weights of 6,000 to 90,000 denier, widths of 1-inch or greater, and with a modulus of 1,400 grams per denier or greater. The multi-calender process of the present invention produces a high strength, high modulus UHMWPE tape at a significantly higher production speed that vastly simplifies and reduces the cost of production of sheets for use in ballistic-resistant sheets and other applications requiring high strength, high modulus tapes.

OBJECTS AND ADVANTAGES

The multi-calender process of the present invention includes several advantages over the prior art, including:

(1) By installing multiple calenders, a portion of the compression and molding work that is performed on the polymer is transferred to the calender units and away from the compactor unit. As a result the compactor can be run at significantly lower pressures, which enables higher production rates. The addition of a second calender unit therefore enables a significant reduction in the size and complexity of the compactor unit.

(2) The multi-calender process enables continuous, high-speed production of an ultra high molecular weight polyethylene tape with high tensile strength and high modulus at lower unit cost and higher throughput.

(3) As a result of producing tape and not fibers, the multi-calender process enables higher draw ratios, including draw ratios of 100 to 1 and higher, and lower incidence of undesirable breaks as a result of processing a tape.

(4) The multi-calender process produces a non-fibrous tape that can be converted into sheets for use in ballistic-resistant articles without the expensive processing steps required for conventional high-strength fibers. The non-fibrous tape can be simply pressed together with pressure, heat and pressure, laminated to an adhesive sheet, or pressed into sheet form and coated with an adhesive to form a sheet for use in a ballistic-resistant article.

(5) The multi-calender process enables production of a high weight non-fibrous tape, including deniers of 6,000 to 90,000 and even higher. The high weight range of the tape, as compared to fibrous high strength components, vastly reduces the number of ends that are required to form a sheet of ballistic-resistant material and also reduces the cost of forming sheet.

(6) Although some prior art patents disclose that compactors combined with a single calender unit can be run at low pressures to produce high modulus and high tenacity UHMWPE, in actuality it has been demonstrated that it is not possible to run a compactor at less than 22 kgf/cm² in a single calender process and produce product with acceptable modulus and tenacity.

These and other objects and advantages of the present invention will be better understood by reading the following description along with reference to the drawings.

TABLE OF NOMENCLATURE

Figure 1:
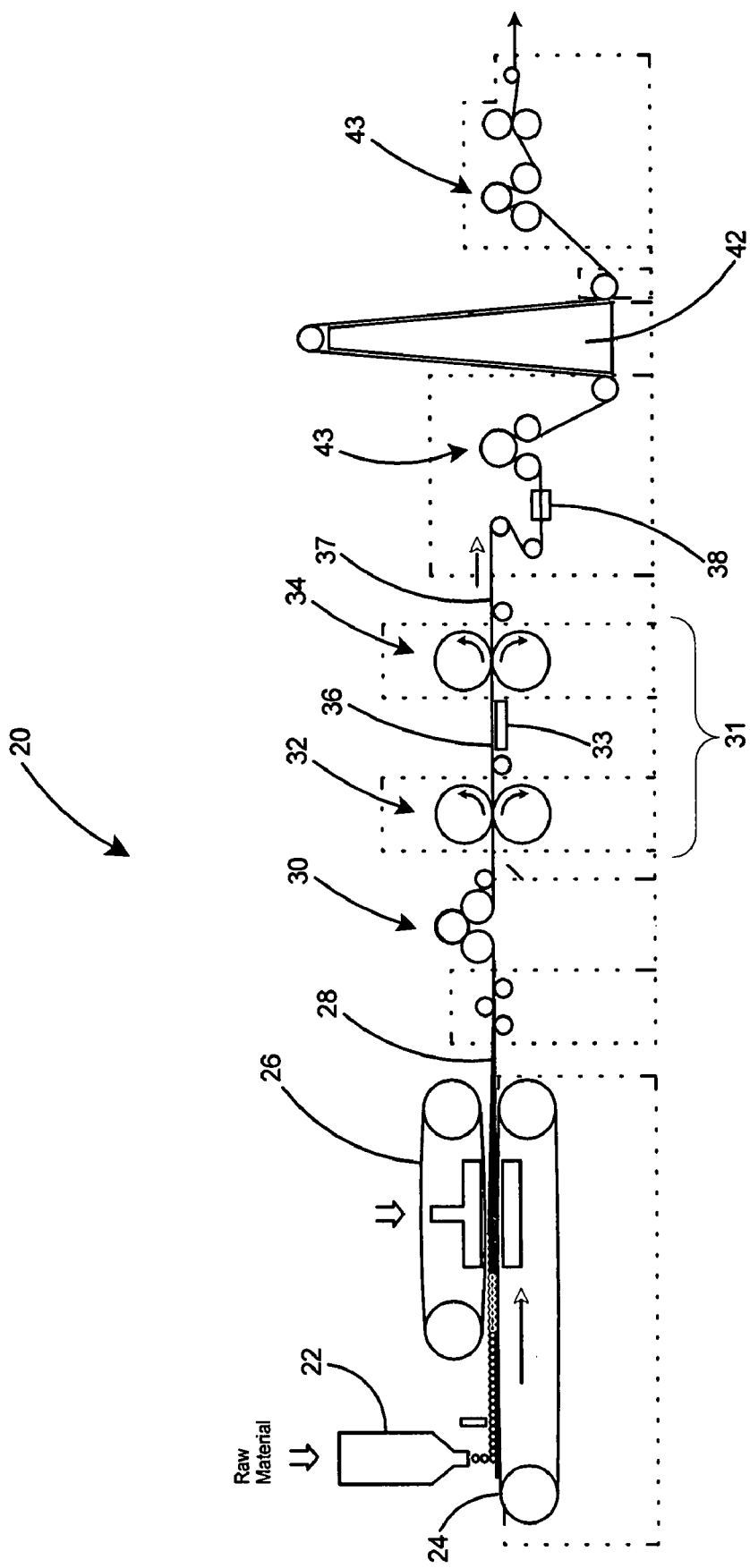
FIG. 1 is a schematic representation of a first portion of a multi-calender production process for the production of UHMWPE tape according to the present invention.

The following is a listing of part numbers used in the drawings along with a brief description:

| Part Number | Description |
|---|---|
| 20 | multi-calender process |
| 22 | raw material hopper |
| 24 | conveying belt |
| 26 | forming station or compaction station |
| 28 | friable UHMWPE sheet |
| 30 | preheater rolls |
| 31 | multi-calender station |
| 32 | first calender station or first rolling station |
| 33 | preheater plate |
| 34 | second calender station or second rolling station |
| 36 | calendered sheet after first rolling station |
| 37 | twice calendered sheet |
| 38 | trimming unit |
| 42 | first stage drawing unit |
| 43 | pull roll set |
| 44 | super drawing unit |
| 46 | first godet stand |
| 48 | first hot shoe drawing unit |
| 50 | first in-line tension sensor |
| 52 | second godet stand |
| 54 | second hot shoe drawing unit |
| 56 | second in-line tension sensor |
| 58 | third godet stand |
| 60 | nip roll stand |
| 62 | fourth godet stand |

DETAILED DESCRIPTION OF THE INVENTION

With reference to FIG. 1 there is shown a multi-calender process 20 for producing high modulus ultra high molecular weight polyethylene tape according to the present invention. The multi-calender process 20 for forming the ultra high modulus polyethylene tape includes forming particulate UHMWPE into a sheet, pressing the air from the sheet, and subsequent calendering and drawing to produce the high modulus tape. Although the process is termed a "multi-calender" process, it should be understood by those practiced in the art that the practice of the invention could just as well be carried out with a single calender stack having multiple nips. The multi-calender process 20 includes forming and lightly pressing a very specific class of UHMWPE particles under very carefully controlled temperature conditions and yield a well-formed polyethylene sheet with a low level of entrained air for subsequent conveying to a multi-calender station 31, calendering the formed sheet in at least two nips, and then drawing the calendered sheet at a high draw ratio under careful tension control at a temperature near the onset of the unconstrained melt of the UHMWPE material to produce a high modulus UHMWPE tape. Although the multi-calender process 20 of the present invention produces what is termed a "tape" herein, the product could also be defined as a film or sheet as it is substantially rectangular shaped in cross-section and includes a width that is significantly larger than the thickness. The term "tape" as used herein refers to UHMWPE products having widths on the order of at least ½ inch or greater and preferably greater than 1 inch, of a generally rectangular cross-section and is substantially different from the conventional "fiber" UHMWPE products of the prior art that are on the order of ⅛ of an inch wide or narrower and are limited in the extent to which they can be drawn as a result of their narrow width. The UHMWPE tape formed by the process of the present invention includes a width of at least 1.0 inch, a thickness of between 0.0015 and 0.004 inch, and a modulus of 1,400 grams per denier (gpd) or greater.

The present invention is a multi-calender process for producing high modulus UHMWPE tape having a very high width to thickness ratio. The process of the present invention produces a high modulus UHMWPE tape that, for example, may include a width of 1.0 inch or greater and a thickness of 0.0025 inch, which indicates a width to thickness ratio of 400:1. The multi-calender process can produce UHMWPE tape in weights from 6,000 denier to 90,000 denier and higher. There is no theoretical limit to the width of the high modulus UHMWPE tape according to the present invention, as tape widths of up to 8.1 inches are currently possible and increases in machine sizes could produce even larger width tapes. Similarly, the denier is not limited to 90,000 but could be increased beyond that by increasing the size of the processing equipment.

As shown in FIG. 1, a raw material hopper 22 introduces a high average molecular weight polyethylene powder or particulates exhibiting a high crystallinity and a high specific heat of fusion to a conveying belt 24 that is conveying from left to right in the figure. The ultra high molecular weight polyethylene particles of the present invention have a viscosity-average molecular weight in the range of 800,000 to 6,000,000, preferably in the range of 800,000 to 5,000,000, and most preferably in the range of 2,500,000 to 4,500,000. A light compression force is applied to the polyethylene powder at forming station 26, while holding the UHMWPE powder at a temperature lower than the melting point of the polyethylene. Preferably the polyethylene particles are maintained at a temperature of 132 to 138° C. for the pressing operation. The light compression force forms the polyethylene powder into a friable UHMWPE polyethylene sheet 28 and removes air from the friable sheet 28 to improve heat transfer at the subsequent calendering stages. According to the present invention, the UHMWPE particles or powder introduced at the forming station 26 must exhibit high crystallinity, preferably above 76% as determined by X-ray diffraction, and a heat of fusion equal to or greater than 220 joules/gram as determined by differential scanning calorimetry, to ensure low levels of entanglement downstream of the first calender station or first rolling station 32. Outside of these crystallinity and heat of fusion parameters, the large UHMWPE molecules undesirably entangle or form knots at the discharge of the first rolling station 32. Outside of the stated crystallinity and heat of fusion parameters, the UHMWPE cannot be drawn into a smooth sheet because of the molecular entanglements. It is critically important to the successful practice of the present invention that the input starting material particulate UHM- WPE possesses the degree of crystallinity and heat of fusion stated herein to meet the low entanglement requirements.

The friable sheet 28 is then preheated by preheater rolls 30 to a temperature near the onset of melt, preferably to a temperature of 132 to 140° C., and then conveyed through a multi-calender station 31 including a first and second rolling station 32 and 34. Calendering is accomplished by the application of pressure with temperatures preferably near the onset of melt. The first rolling station 32 calenders, shears, and elongates the UHMWPE sheet, thereby orienting and stretching the large UHMWPE molecules. The primary objective in the first rolling station 32 is to increase the density of the sheet to at least $0.89/cm^3$ before it enters the second rolling station 34.

As a result of the compression, shearing, and drawing of the UHMWPE molecules in the first rolling station 32, the calendered sheet 36 exits the first rolling station 32 in a partially oriented state. The partially oriented sheet 36, preferably at a density of at least $0.89 \text{ m/cm}^3$, is preheated by preheater plate 33 to a temperature of preferably 135 to 143° C. and then enters a second rolling station 34 in which the UHMWPE sheet is further calendered, thus shearing the UHMWPE molecules and elongating the sheet. The rolling ratio is preferably split between the two calender stations with each calender station performing some of the drawing. The now fully oriented polyethylene web 37 exits the second rolling station 34 preferably at a speed of between 4 and 18 meters per minute. Each of the calender stations preferably includes a pair of nip rolls with one of the nip rolls running at a different speed than the other nip roll.

As shown in FIG. 1, after the second rolling station 34, the twice calendered UHMWPE sheet 37 enters a trimming unit 38 in which the edges may be trimmed off if desired. The sheet 37 then passes through a first stage drawing unit 42 in which the sheet is drawn at a ratio of between 2:1 to 4:1. At the exit of the first stage drawing unit 42 of the multi-calender process 20 shown in FIG. 1, the UHMWPE sheet has undergone a total draw ratio of between 14:1 and 24:1 and is at a thickness of between 0.007 and 0.012 inch. The speed at the first stage drawing unit 42 is preferably between 8 and 60 meters per minute (m/min). Several pull roll sets 43 are included in the multi-calender process 20 of FIG. 1 for advancing the UHMWPE sheet through the process.

Preferably, in the multi-calender process, the UHMWPE powder is formed or compressed at a temperature of between 132° C. and 138° C. The UHMWPE powder is compressed slightly at the forming station 26 with a compaction ratio of from 1.2:1 to 5:1 having been found to yield a friable polyethylene web with a minimal amount of air retained in the sheet. The pressure applied at the forming station 26 is preferably between 2 and 20 $kgf/cm^2$ and at a belt speed of preferably between 0.85 and 1.7 m/min or most preferably between 1.2 and 1.5 m/min. The polyethylene sheet must be formed with enough integrity to withstand the mechanical handling required to convey it to the first calender station. The light pressure applied at the forming station 26 produces a friable sheet that is of very uniform density and thickness, has most of the air removed, and is suitable for further processing in accordance with the method of the present invention. A pressed sheet exhibiting a density preferably of between 0.65 $g/cm^3$ and 0.90 $g/cm^3$ is preferred as the sheet starting material for the subsequent first rolling station 32.

The total draw ratio performed on the polyethylene sheet in the multi-calender station 31 is preferably between 2 and 7. The sheet is further drawn in the first stage drawing unit 42 and in subsequent drawing stations (not shown) to a total draw of preferably greater than 100:1. Drawing is preferably performed at a constant and controlled tension and at a temperature preferably between 140° C. and 158° C. At temperature levels below the previously defined range, drawing of the UHMWPE tape is difficult or impossible or, if drawing occurs, mechanical damage may result in the tape. At temperatures above this range, low tension may result in possible destruction of larger crystals or complete melting and separation of the tape may occur.

Tension control throughout the calendering and drawing steps is important for controlling the thickness of the final UHMWPE product of the present invention. It is preferable to maintain a constant tension of between 0.5 g/denier and 5.0 g/denier to achieve the desired modulus of the final product. At tension levels below 0.5 g/denier drawing will occur but with some loss of modulus, possible melting, or separation of the tape. At tension levels above 5.0 g/denier the tape is susceptible to damage or breakage.

Figure 3:
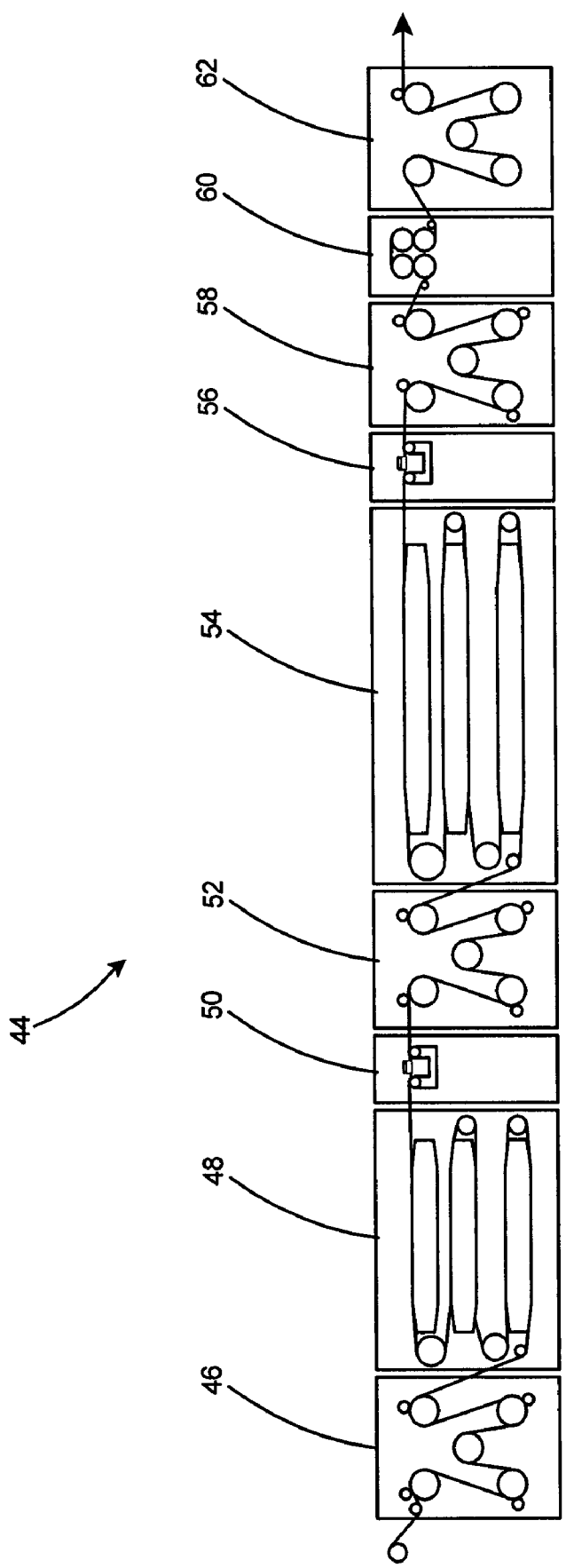
FIG. 3 is a schematic representation of a second portion of a production process for the production of UHMWPE tape according to the present invention.

With reference to FIG. 3, the polyethylene sheet 37 exiting the multi-calender process then enters a super drawing unit 44 in which the sheet is heated to the proper temperature for drawing and then drawn an additional amount of 4:1 or greater. The super drawing unit 44 includes a first godet stand 46, a first hot shoe drawing unit 48, a first in-line tension sensor 50, a second godet stand 52 with all rolls steam heated, a second hot shoe drawing unit 54, a second in-line tension sensor 56, a third godet stand 58 with all rolls steam heated, a nip roll stand 60, and a fourth godet stand 62. At the first 48 and second 54 hot shoe drawing units, the UHMWPE is preferably drawn at a constant and controlled tension and at a temperature of between 140 and 158° C. The polyethylene exiting the super drawing unit 44 has undergone a total draw ratio of at least 100:1 wherein the draw ratio is defined as the length after stretching divided by the length before stretching, thereby producing a highly oriented ultra high molecular weight polyethylene tape having a modulus of greater than 1,400 gpd. The total draw ratio is a product of the individual draw ratios of each separate drawing stage. As an example with reference to FIGS. 1 and 3, with a draw ratio of 7:1 in the multi-calender station 31, a draw ratio of 3.6:1 in the first stage drawing unit 42, and a draw ratio of 4:1 in the super drawing unit 44 would equal a total draw ratio of 7×3.6×4 or a total draw ratio of 100:1. The total draw ratio of 100:1 or greater is one critical parameter to meeting the desired molecular orientation and modulus in the final tape product. Hence, the amount of drawing in each individual zone, such as in the multi-calender station 31, the first stage drawing unit 42 (see FIG. 1), the first hot shoe drawing unit 48, and the second hot show drawing unit 54, can be varied as desired and will still form the high modulus UHMWPE tape according to the present invention, as long as the overall draw ratio is maintained at 100:1 or greater. The highly oriented UHMWPE tape at the exit of the super drawing unit is maintained at a width of at least 1.0 inch and at a thickness of between 0.0015 and 0.004 inch.

The efficiency of the process for producing high modulus ultra high molecular weight polyethylene tape from the exit of the trimming unit 38 to the final product is quite high, at least 95%, as a result of the tape construction and the resultant minimal amount of breakage. As compared prior art processes in which UHMWPE fibers are produced from compacted polyethylene particles, the tape product significantly reduces the amount of breaks and greatly improves efficiency. Production of tape rather than fibers permits a higher draw ratio, which enables production of an UHMWPE product having higher tensile strength and modulus.

Example

Figure 2:
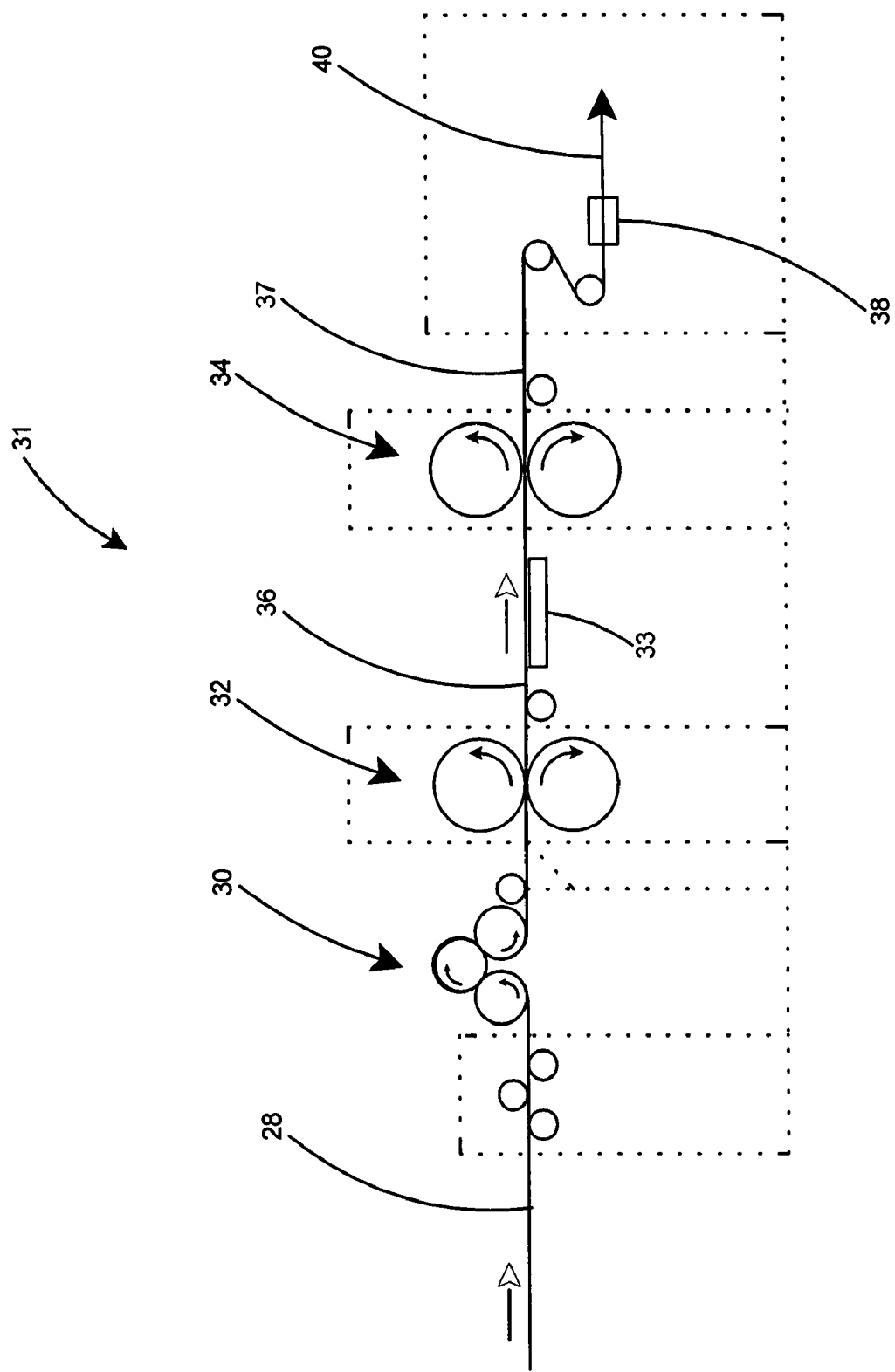
FIG. 2 is an expanded view of the multi-calender portion of the process depicted in FIG. 1.

For a specific example or preferred embodiment of the non-fibrous high modulus ultra high molecular weight polyethylene tape of the present invention, with reference to FIGS. 1 and 2, ultra high molecular weight polyethylene powder having a viscosity average molecular weight of 3,500,000, a crystallinity of greater than 76%, and a heat of fusion of greater than 220 joules/gram, is fed from the raw material hopper 22 with the conveying belt 24 running at 1.3 m/min. A compression force of 13 kgf/cm$^2$ is applied to compress the UHMWPE powder to form a friable sheet 28 with the polymer particles fused together and the sheet having a thickness of approximately 0.06 inch. The friable sheet 28 is heated with preheater rolls 30 and is calendered and drawn in the multi-calender station 31. The friable UHMWPE sheet is stretched in the multiple calender station 31 by a draw ratio of 7 (length out of second calender station 34 is 7 times the length into the first rolling station 32). The UHMWPE sheet is drawn an additional 2.5× (2.5 times) in drawing unit 42 thereby adding additional orientation to the polyethylene molecules. In the super drawing unit 44 of FIG. 3, the UHMWPE tape is drawn, under carefully controlled tension and at a temperature of between 140 and 158° C., an additional amount to achieve a total draw ratio of 120:1. The final product exiting the super drawing unit 44 of FIG. 3 is a non-fibrous, highly oriented 19,000 denier UHMWPE tape having a nominal width of 1.62 inches, a nominal thickness of 0.0025 inch, a width to thickness ratio of 648:1, and a tensile modulus of 1,600 grams per denier.

Although the specific embodiment shown herein depicts a forming station 26 (see FIG. 1) including an upper and lower rotating belt, it should be understood that the high molecular weight polyethylene powder could be pressed into a friable sheet by other means, such as by feeding the polyethylene powder into the nip of a pair of cooperatively rotating compression rolls.

Although the preferred embodiment shown herein includes two rolling or calender stations, additional calender stations are within the scope of the invention. A process for continuously producing a highly oriented non-fibrous ultra high molecular weight polyethylene tape according to the present invention could include three, four, or more calender units and be within the scope of the invention. Thus the rolling and stretching of the UHMWPE would be distributed among the various calender stations.

Although in the specific example presented above the denier was 19,000, it should be emphasized that the non-fibrous, highly oriented, high modulus UHMWPE tape of the present invention can be produced in various weights including deniers from 6,000 to 90,000 and higher. Additionally, although specific parameters and draw ratios have been presented for the method of the present invention, it should be emphasized that the pressures and draw ratios can be varied in and among the first rolling station 32, the second rolling station 34, the first stage drawing unit 42, and at the first 48 and second 54 hot shoe drawing units and still produce the non-fibrous, highly oriented UHMWPE tape of the present invention as long as the total draw ratio is maintained at 100:1 or greater. Additionally, in the specific example cited herein the tape width is cited as 1.62 inches, which is dictated by the specific processing equipment used in the example. It should be noted that the non-fibrous, highly oriented UHMWPE tape can be produced at widths of 8 inches or even larger with properly sized equipment. The width to thickness ratio is preferably at least 400:1.

Having thus described the invention with reference to a preferred embodiment, it is to be understood that the invention is not so limited by the description herein but is defined as follows by the appended claims.

What is claimed is:

1. A process for continuously producing a highly oriented non-fibrous ultra high molecular weight polyethylene tape comprising:
   feeding particles of ultra high molecular weight polyethylene into a forming device, said forming device including an upper and lower rotating belt;
   applying pressure from said upper and lower rotating belts to said polyethylene particles between said upper and lower rotating belts to remove a substantial amount of air from said polyethylene particles and to bond said polyethylene particles into a continuous sheet;
   heating said continuous sheet to a temperature near the melting point of said polyethylene;
   rolling and stretching said heated sheet in a first calender unit to form a partially oriented polyethylene web;
   rolling and stretching said partially oriented polyethylene web in at least one additional calender unit to form a fully oriented polyethylene web; and
   drawing said fully oriented polyethylene web to form said highly oriented non-fibrous ultra high molecular weight polyethylene tape, said UHMWPE polyethylene tape including a modulus of at least 1,400 grams per denier.

2. The process of claim 1 wherein said pressure from said upper and lower rotating belts is between 2 and 20 kg/cm$^2$.

3. The process of claim 1 wherein said partially oriented sheet at the exit of said first calender unit includes a density of at least 0.93 gm/cm$^3$.

4. The process of claim 1 wherein said ultra high molecular weight polyethylene particles include a viscosity-average molecular weight of between 800,000 to 4,500,000.

5. The process of claim 1 wherein said UHMWPE polyethylene tape includes
   a denier of 6,000 or greater;
   a width of at least 1.0 inch;
   a thickness of between 0.0015 and 0.004 inch; and
   a width to thickness ratio of at least 400:1.

6. The process of claim 1 wherein said ultra high molecular weight polyethylene tape is drawn to a total draw ratio of 100:1 or greater.

7. The process of claim 1 wherein said ultra high molecular weight polyethylene particles include
   a crystallinity of at least 76%; and
   a heat of fusion of 220 joules/gram or greater.

8. The process of claim 1 wherein said partially oriented polyethylene at the exit of said first calender includes a density of at least 0.89/cm$^3$.

9. The process of claim 1 wherein said tape includes intermediate stages of
   a friable sheet formed from light pressing of UHMWPE particles;
   a partially oriented UHMWPE sheet formed from calendering said friable sheet in said first calender unit;
   a fully oriented UHMWPE sheet formed from calendering said partially oriented UHMWPE sheet in said second calender unit; and
   a highly oriented UHMWPE tape formed from drawing said fully oriented UHMWPE sheet under carefully controlled tension and carefully controlled temperature to a total draw ratio of 100:1 or greater.

10. The process of claim 9 wherein said tension in drawing said fully oriented UHMWPE sheet is between 0.5 and 5.0 grams per denier.

11. The process of claim 9 wherein said temperature of calendering is between 132° C. and 143° C.

12. The process of claim 9 wherein said pressing is at a temperature between 132° C. and 138° C.

13. The process of claim 1 wherein said tape is a monolithic structure.

14. The process of claim 1 wherein each of said first and said additional calender units stretch the polyethylene sheet to a total draw ratio of between 2 and 7.

15. The process of claim 1 wherein each of said calender units includes
   a pair of nip rolls including a first nip roll and a second nip roll; and
   said first nip roll runs at a different speed than said second nip roll.

16. The process of claim 1 wherein the speed of said fully oriented polyethylene web exiting said additional calender unit is between 4 and 18 meters per minute.

17. A process for producing a highly oriented non-fibrous ultra high molecular weight polyethylene tape including the steps of:
   providing an ultra high molecular weight polyethylene powder having a viscosity-average molecular weight of between 800,000 to 4,500,000;
   pressing said polyethylene powder at a temperature lower than the melting point of said polyethylene powder to form a friable polyethylene sheet and remove air from said friable sheet;
   calendering said friable polyethylene sheet between a first set of calender rolls to form a partially oriented polyethylene sheet;
   calendering said partially oriented polyethylene sheet between at least one additional set of calender rolls to form a fully oriented polyethylene sheet; and
   drawing said fully oriented polyethylene sheet to form a highly oriented polyethylene tape of substantially rectangular cross-section and having a modulus of at least 1,400 gpd.

18. The process of claim 17 wherein said friable polyethylene sheet, said partially oriented polyethylene sheet, and said highly oriented polyethylene tape are maintained in a monolithic state and not subjected to slitting or splitting.

19. The process of claim 17 including
   an efficiency defined by weight of first grade tape produced divided by weight of polyethylene powder input; and
   said efficiency is at least 95%.

* * * * *